United States Patent
Benoit et al.

[11] Patent Number: 5,163,795
[45] Date of Patent: Nov. 17, 1992

[54] FRONT MOUNTED RIVET WITH INTERLOCKED DRIVE PIN

[75] Inventors: Thomas A. Benoit, Bourbonnais; James E. Marion, Bonfield, both of Ill.

[73] Assignee: Illionis Tool Works, Inc., Glenview, Ill.

[21] Appl. No.: 866,327

[22] Filed: Apr. 9, 1992

[51] Int. Cl.⁵ ............................................. F16B 13/06
[52] U.S. Cl. ....................................... 411/45; 411/41; 411/48; 411/57
[58] Field of Search ............ 411/48, 39, 40, 41, 411/45, 57, 60, 15, 46

[56] References Cited

U.S. PATENT DOCUMENTS

| | | | |
|---|---|---|---|
| 2,424,602 | 7/1947 | DeSwart | 411/41 |
| 3,832,931 | 9/1974 | Talan | 411/56 X |
| 3,918,130 | 11/1975 | Poe | 411/41 X |
| 4,488,843 | 12/1984 | Achille | 411/60 |
| 4,571,134 | 2/1986 | Beglinger et al. | 411/41 |
| 4,610,587 | 9/1986 | Wollar et al. | 411/45 X |
| 4,856,950 | 8/1989 | Bushnell | 411/41 |

Primary Examiner—Rodney M. Lindsey
Attorney, Agent, or Firm—Albert J. Brunett

[57] ABSTRACT

A fastener including a body portion having a head member and a shank member integrally formed with one side of the head member, the head member including a central aperture and at least one flexible engagement member intergrally formed with the head member opposite the shank member and extending intothe aperture a predetermined distance, the shank member including at least two substantially resilient leg member each having a conically shaped interior surface which oppose each other forming a tapered axial bore through the shank member tapering away from and in cooperative alignment with the aperture and a drive pin having a predetermined length and cross-sectional configuration for complementary engagement with the aperture, flexible engagement member, axial bore and leg members, the drive pin icluding at least a first concave longitudinal channel formed along its length and extending into the drive pin which includes at least a first lateral ramp member extending across the width of the first channel for cooperative engagement with the flexible engagement member so that upon insertion of the drive pin through the aperture the first ramp member engages and outwardly flexes the flexible engagement member to enable passage of the first ramp member thereby, the engagement member thereafter being releasably locked behind the first ramp member to restrict removal of the drive pin from the aperture of the head member.

11 Claims, 1 Drawing Sheet

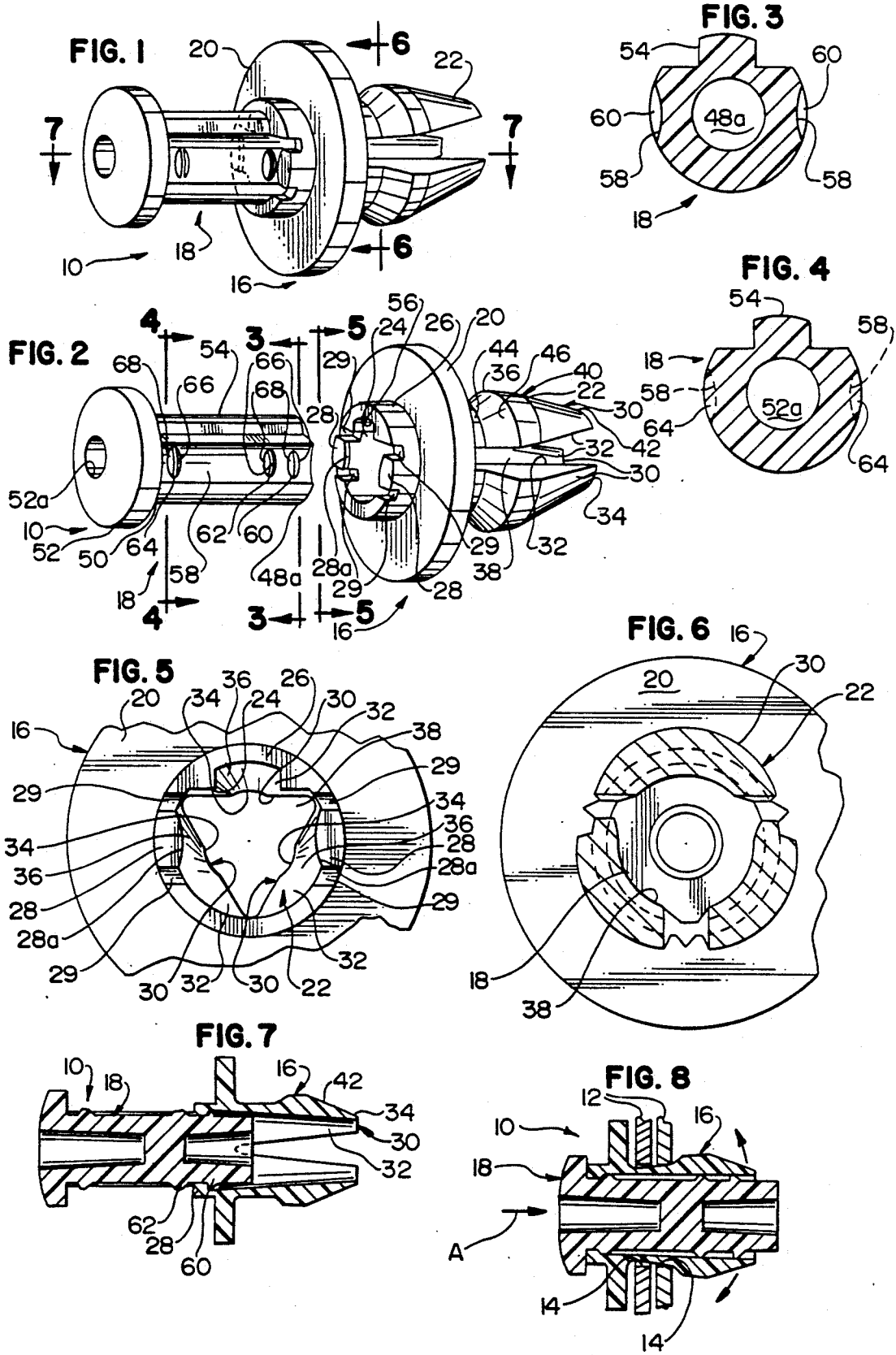

FRONT MOUNTED RIVET WITH INTERLOCKED DRIVE PIN

BACKGROUND OF THE INVENTION

1. Field of the Invention

This invention relates generally to front mounted rivet fasteners and more particularly to a front mounted rivet fastener having a drive pin which is securely and releasably interlocked with the head of the rivet body in both the pre-driven and driven positions of the drive pin where the interlocking mechanism is reusable and operates independently of the shank or legs of the rivet body.

2. Description of the Related Art

Rivet fasteners typically are utilized to secure two members together and include a rivet body and a corresponding drive pin. The rivet body includes a head portion and a shank portion integrally formed with one side of the head portion where the head portion includes a central aperture therethrough in alignment with an axial bore formed through the shank portion. After the shank portion is inserted through aligned apertures formed in the members which are to be connected, the drive pin is inserted through the aperture and the through-bore to contact and outwardly expand the shank portion behind the members and provide the desired fastening.

Such rivet fasteners typically are formed with two discrete parts, a drive pin and a rivet body. Accordingly, increased assembly time and costs are incurred to position both the rivet body and the drive pin and then insert the drive pin within the rivet body.

Rivet fasteners also have been designed with a drive pin which is frangibly connected to a portion of the rivet body to provide a one-piece fastener before assembly or driving of the drive pin within the rivet body. An example of such a one-piece fastener is shown in U.S. Pat. No. 4,488,843 which is assigned to the same assignee as the assignee herein. Upon driving of the drive pin into the rivet body the frangible connection is broken, thereby separating the connection between the drive pin and the rivet body. Such a frangible connection, however, can fracture during packaging, shipping, storage or during handling just prior to use which defeats the purpose of the one-piece fastener. Additionally, if the fastener is removed after installation, the drive pin cannot be reattached to the rivet body.

It therefore is desirable to provide a rivet fastener having a drive pin securely and releasably interconnected with a rivet body both before and after the drive pin is driven into the rivet body which is reusable and does not interfere with the action of the shank of the rivet body.

SUMMARY OF THE INVENTION

The invention provides a fastener including a body portion having a head member and a shank member integrally formed with one side of the head member. The head member includes a central aperture extending therethrough having a predetermined configuration and at least one substantially flexible engagement member integrally formed with a side of the head member opposite the shank member and extending into the aperture a predetermined distance. The shank member extends a predetermined distance outwardly away from the head member and includes at least two substantially resilient leg members each having a conically shaped interior surface which oppose each other to form a tapered axial bore through the shank member tapering away from and in cooperative alignment with the aperture of the head member. A drive pin also is included having a predetermined length and a predetermined cross-sectional configuration for complementary engagement with the aperture, the flexible engagement member, the axial bore and the leg members. The drive pin includes at least a first concave longitudinal channel formed along its length and extending into the drive pin a predetermined distance. The first channel includes at least a first lateral ramp member extending across the width of the first channel for cooperative engagement with the flexible engagement member of the head member so that upon insertion of the drive pin through the aperture the first ramp member engages and outwardly flexes the flexible engagement member with respect to the aperture to enable passage of the first ramp member past the engagement member, the engagement member thereafter being releasably locked behind the first ramp member to restrict removal of the drive pin from the aperture of the head member.

BRIEF DESCRIPTION OF THE DRAWINGS

FIG. 1 is a perspective view of the rivet fastener of the invention illustrating the drive pin in its pre-driven position releasably interlocked with the rivet body;

FIG. 2 is a perspective exploded view of the rivet fastener illustrating the separate rivet body and drive pin;

FIG. 3 is a lateral cross-sectional view of the drive pin taken along line 3—3 of FIG. 2 and in the direction indicated generally illustrating the typical cross-sectional configuration of the drive pin;

FIG. 4 is a lateral cross-sectional view of the drive pin taken along line 4—4 of FIG. 2 and in the direction indicated generally illustrating the cross-sectional configuration of the drive pin and a ramp member thereof;

FIG. 5 is an end view of the rivet body taken along line 5—5 of FIG. 2 and in the direction indicated generally illustrating the configuration of the aperture of the head member and the tapered axial bore of the shank member;

FIG. 6 is a lateral cross-sectional view of the rivet body taken along line 6—6 of FIG. 1 and in the direction indicated generally illustrating the tapered axial bore formed by the leg members of the shank member;

FIG. 7 is a longitudinal cross-sectional view of the fastener of the invention taken along line 7—7 of FIG. 1 and in the direction indicated generally illustrating the predriven position of the fastener; and FIG. 8 is a longitudinal cross-sectional view of the fastener of the invention, similar to FIG. 7, illustrating the fastener in its driven position connecting two panels.

DESCRIPTION OF THE PREFERRED EMBODIMENTS

Referring to FIG. 1, the rivet fastener of the invention is designated generally by the reference numeral 10. As FIG. 8 illustrates, the fastener 10 can be utilized to connect two members, such as panels 12, through apertures or slots 14 in the panels 12.

As FIGS. 1 and 2 illustrate, the fastener 10 includes two pieces, a rivet body portion 16 and a drive pin 18. Preferably, the rivet body 16 and drive pin 18 are molded from plastic, but the particular material can vary.

The rivet body 16 includes a head member 20 and a shank member 22 which is integrally formed with one side of the head member 20. The head member 20 substantially is annular in shape and is utilized to abut the outer of the two panels 12 to prevent the rivet body 16 from extending through the apertures 14. The particular shape and thickness of the head member 20 can vary.

As FIGS. 2 and 5 illustrate, the head member 20 includes a central aperture 24 therethrough having a predetermined configuration and including a collar 26 upstanding a predetermined distance from the side of the head member 20 opposite the shank member 22. Preferably, to provide a secure releasable connection between the head member 20 and the drive pin 18, the collar 26 can include substantially flexible engagement members 28 formed therewith, one each positioned on opposite sides of the aperture 24 between slots 29 formed in the collar 26. The engagement members 28 each include a convex shaped rib 28a which protrudes slightly into the aperture 24 for engagement with the drive pin 18 as will be explained hereinafter.

It is to be noted that the width and/or depth of the slots 29 on either side of each engagement member 28, as well as the distance between two adjacent slots 29, controls the degree of flexing of the engagement members 28 and the convex ribs 28a and in turn controls the connecting or locking force. Specifically, for a given slot spacing, wider and/or deeper slots 29 provide more flexible engagement members 28 which in turn provide a weaker locking force, while narrow and/or shallower slots 29 provide less flexible engagement members 28 which in turn provide a stronger locking force. Accordingly, the size of the slots 29 and/or the distance between adjacent slots 29 can be adjusted to allow the fastener 10 to have a variety of locking forces and/or be made of different materials while still providing the desired retention.

The shank member 22 preferably is formed by three elongate substantially flexible leg members 30, each of which are integrally formed with and depend from one side of the head member 20 and are positioned symmetrically about the aperture 24 in a triangular or delta configuration. Each leg member 30 includes an interior surface 32 which is substantially conical between a first tapered distal end 34 and a second flared proximal end 36. It is to be noted that the number of leg members 30 as well as their particular shape, size and positioning can vary so long as they function substantially as described herein.

Accordingly, due to the tapered, conical shape of the interior surfaces 32 and the positioning of the leg members 30, the leg members 30 form a tapered axial bore 38 between the leg members 30. The axial bore 38 thus extends through the shank member 22 and substantially is in alignment with the aperture 24 of the head member 20. As FIG. 8 illustrates and as will be explained in detail below, after the drive pin 18 is inserted through the aperture 24, it enters the axial bore 38 and engages the tapered conical surfaces 32 of the legs 30. Upon continued insertion of the drive pin 18, the legs 30 are driven outward behind the panels 12 to provide the desired fastening of the fastener As FIG. 2 illustrates, to assist in insertion of the legs 30 into the apertures 14 of the panels 12, each leg 30 also includes an outer surface 40 which includes a beveled portion 42 on its distal end 34. To provide a seat for the panels 12 with respect to each leg member 30, each leg member 30 includes a tubular portion 44 on its proximal end where one side of the tubular portion 44 terminates with the head member 20 and the opposite side terminates with a tapered annular shoulder 46 formed with each leg 30. It is to be noted that the cooperation between the head member 20, the tubular portion 44 and the tapered shoulder 46 enables the fastener 10 to be utilized with panels 12 of different thickness and apertures 14 of different shapes and sizes.

The drive pin 18 is elongate and includes a first distal end 48, having a conical axial end channel 48a, and a second opposite proximal end 50 which terminates in a head portion 52, having a conical axial end channel 52a. The particular cross-sectional configuration of the drive pin 18 can vary. Preferably, the channels 48a and 52a only extend a short distance into the drive pin 18 and can be of a different shape or eliminated if desired. As FIGS. 2 and 3 illustrate, to orient the drive pin 18 with respect to the aperture 24 for proper alignment therewith, the drive pin 18 preferably includes a substantially rectangular shaped key 54 which extends along the length of the drive pin 18 for cooperative engagement with a corresponding keyway 56 formed in the aperture 24 of the head member 20.

To releasably connect the drive pin 18 to the head member 20, the drive pin 18 preferably includes two concave channels 58 formed on opposite sides of the drive pin 18 and extending along its length. Each channel 58 preferably includes first, second and third ramp members 60, 62 and 64, respectively, which extend across the width of the channels 58 and are designed for engagement with the ribs 28a of the flexible engagement members 28 of the collar 26 of the head member 20 as will be explained below.

Each ramp member 60, 62 and 64 includes a first ramped surface 66 facing the distal end 48 of the drive pin 18 and a second shoulder surface 68 facing the proximal end 50 of the drive pin 18. It is to be understood, however, that the number of ramp members and their particular shape can vary so long as they function substantially as described herein.

Briefly, during insertion of the drive pin 18 within the aperture 24 of the head member 20, the ramp members 60, 62 and 64 initially contact the convex ribs 28a of the flexible engagement members 28 to flex them outwardly away from the aperture 24 so that the ramp members 60, 62 and 64 can pass over the ribs 28a. Thereafter, the ribs 28a snap behind the ramp members 60, 62 and 64 and the drive pin 18 is restricted from being removed from the aperture 24 by contact between the ribs 28a and the shoulder surface 68 of the ramp members 60, 62 and 64.

The first ramp member 60 is formed proximate the distal end 48 of the drive pin 18 and is utilized to restrict removal of the drive pin 18 from the aperture 24 with the drive pin 18 in a pre-driven position with respect to the aperture 24. To assist in maintaining the drive pin 18 in a pre-driven position, the second ramp member 62 is positioned proximate the first ramp member 60 on the side of the first ramp member 60 formed by the shoulder 68.

Thus, as FIGS. 1 and 7 illustrate, when the drive pin 18 is positioned in its pre-driven position, the engagement members 28 preferably are positioned between the first and second ramp members 60 and 62 and restrict movement of the drive pin 18 in either direction with respect to the aperture 24. It is to be noted that the shoulder portions 68 of the first ramp members 60 restrict removal of the drive pin 18 while the ramp portions 66 of the second ramp members 62 restrict further insertion of the drive pin 18 into the aperture 24. Additionally, in its pre-driven position the drive pin 18 is interlocked with the rivet body 16 and is independent from, and does not interfere with, the legs 30 of the shank member 22.

Preferably, the rivet fastener 10 is integrally molded in one piece with the rivet body 16 initially being frangibly connected to the drive pin 18 at one or more positions about the aperture 24 and the distal end 48 of the drive pin 18 with the drive pin 18 aligned with the aperture 24 (not illustrated.) Thereafter, the drive pin 18 is driven a slight distance into the aperture 24 of the rivet body 16 sufficient to break the frangible connection and enable the engagement members 28 to ride up the ramped surfaces 66 of the first ramp members 60. The rivet fastener 10 then is ready for storage, shipment and/or use. Alternatively, the drive pin 18 can be driven any distance within the aperture 24 and remain in that position prior to use or may not be driven at all thereby leaving the frangible connection intact, if desired.

In use, such as to connect the panels 12, the drive pin 18 preferably initially is positioned with respect to the aperture 24 of the rivet body 16 so that the engagement members 28 are between the first and second ramp members 60 and 62 as illustrated in FIG. 7. As FIG. 8 illustrates, the shank member 22 then is inserted through both of the apertures 14 of the panels 12. Due to the beveled portion 42 of the distal end 34 of each leg member 30, the shank member 22 can be inserted without having to manually squeeze the legs 30 together since the cooperation between the apertures 14 and the beveled portions 42 provides inward flexing of the legs 30. Next, the drive pin 18 is driven or pushed through the aperture 24 and into axial bore 38 in the direction of arrow "A" in FIG. 8 until the engagement members 28 pass over the second and third ramp members 62 and 64 and are seated behind the shoulders 68 of the third ramp members 64 which restricts removal of the drive pin 18. As the drive pin 18 is driven into the aperture 24 and axial bore 38, the distal end 48 engages the tapered conical interior surfaces 32 of each leg 30 and flexes the legs 30 outward to seat behind the panels 12. In this position, the rivet fastener 10 provides secure connection of the panels 12.

To disconnect the panels 12, the drive pin 18 is pulled back out of the aperture 24 and axial bore 38. The rivet body 16 then may be pulled out of the apertures 14 of the panels 12 enabling the panels 12 to be separated. To assist in removing the drive pin 18 and/or the rivet body 16, a tool (not illustrated) may be utilized and the tapered shoulders 46 of the legs 30 provide inward flexing of the legs 30 to enable removal of the rivet body 16 from the apertures 14 of the panels 12.

It is to be noted that after removal of the drive pin 18 from the aperture 24, the drive pin 18 can be reinserted within the aperture 24 to its initial position as described above with the engagement members 28 being positioned between the first and second ramp members 60 and 62. Thus, the drive pin 18 can be releasably connected to the rivet body 16 to again provide a one-piece fastener 10 so that the drive pin 18 is not misplaced and to enable easy reassembly of the panels 12, if desired.

Alternatively, the drive pin 18 may not be pulled all the way out of the aperture 24 while still enabling removal of the rivet body 16. The drive pin 18 only need be pulled out so that the engagement members 28 are positioned between the first and second ramp members 60 and 62. In this situation, the drive pin 18 does not lose contact with the rivet body 16 which can be removed from the apertures 14 of the panels 12 as described above.

Modifications and variations of the present invention are possible in light of the above teachings. For example, the drive pin 18 can include any number of channels 58 and ramp members 60, 62 or 64 and can be of any desired configuration so long as the rivet fastener 10 operates substantially as described herein. It is therefore to be understood that within the scope of the appended claims, the invention may be practiced otherwise than as specifically described.

What is claimed and desired to be secured by Letters Patent is:

1. A fastener comprising:
   a body portion having a head member and a shank member integrally formed with one side of said head member, said head member including a central aperture extending therethrough having a predetermined configuration and at least one substantially flexible engagement member integrally formed with a side of said head member opposite said shank member and extending into said aperture a predetermined distance, said shank member extending a predetermined distance outwardly away from said head member and including at least two substantially resilient leg members each having a conically shaped interior surface which oppose each other to form a tapered axial bore through said shank member tapering away from and in cooperative alignment with said aperture of said head member; and
   a drive pin having a predetermined length and a predetermined cross-sectional configuration for complementary engagement with said aperture, said flexible engagement member, said axial bore and said leg members, said drive pin including at least a first concave longitudinal channel formed along its length and extending into said drive pin a predetermined distance, said first channel including at least a first lateral ramp member extending across the width of said first channel for cooperative engagement with said flexible engagement member of said head member so that upon insertion of said drive pin through said aperture said first ramp member engages and outwardly flexes said flexible engagement member with respect to said aperture to enable passage of said first ramp member past said engagement member, said engagement member thereafter being releasably locked behind said first ramp member to restrict removal of said drive pin from said aperture of said head member.

2. The fastener as defined in claim 1 wherein said drive pin includes a first distal end for insertion through said aperture and said axial bore and a second opposite proximal end having a drive head formed integrally therewith.

3. The fastener as defined in claim 2 wherein said first ramp member is positioned proximate said distal end of said drive pin to connect said drive pin in a pre-driven position to said head member.

4. The fastener as defined in claim 2 wherein said first ramp member is positioned proximate said proximal end of said drive pin to connect said drive pin in a driven position to said head member.

5. The fastener as defined in claim 2 including a second lateral ramp member extending across the width of said first channel for cooperative engagement with said flexible engagement member of said head member, said second ramp member being positioned proximate the side of said first ramp member opposite said first distal end of said drive pin to assist in maintaining said drive pin in said pre-driven position with said engagement member being positioned between said first and second ramp members.

6. The fastener as defined in claim 5 including a third lateral ramp member extending across the width of said first channel for cooperative engagement with said flexible engagement member of said head member, said third ramp member being positioned proximate said second proximal end of said drive pin to connect said drive pin in a driven position with respect to said head member.

7. The fastener as defined in claim 1 including a keyway formed in the side wall of said aperture and a corresponding key formed along the length of said drive pin for orientation of said drive pin with respect to said aperture.

8. The fastener as defined in claim 1 wherein said head member includes an annular collar member upstanding a predetermined distance from the side of said head member opposite said shank member, a central aperture of said collar member being in alignment with said central aperture of said head member, said collar member including a pair of slots extending therethrough in a direction substantially perpendicular to a central axis of said aperture of said collar member, said slots being spaced apart a predetermined distance to form said engagement member therebetween, each slot having a predetermined width and depth selected to cooperate with the spacing between said slots to provide a desired degree of flexibility to said engagement member.

9. The fastener as defined in claim 2 wherein said head member includes at least two substantially flexible engagement members integrally formed with a side of said head member opposite said shank ember and extending into said aperture a predetermined distance and said drive pin includes a second concave longitudinal channel formed along its length and extending into said drive pin a predetermined distance, said second channel including a fourth lateral ramp member extending across the width of said second channel for cooperative engagement with one of said at least two engagement members with said first ramp member of said first channel being for engagement with the other of said engagement members to restrict removal of said drive pin from said head member.

10. The fastener as defined in claim 9 wherein said first and fourth members are positioned proximate said first distal end of said drive pin to connect said drive pin in a pre-driven position to said head member.

11. The fastener as defined in claim 1 wherein the flexibility of said engagement member is adjustable.

* * * * *